US006766393B2

(12) United States Patent
Zack (10) Patent No.: US 6,766,393 B2
(45) Date of Patent: *Jul. 20, 2004

(54) METHOD AND APPARATUS FOR TRANSFERRING DATA BETWEEN INDEPENDENT FIBER CHANNEL ARBITRATED LOOPS IN AN INTERACTIVE INFORMATION DISTRIBUTION SYSTEM

(75) Inventor: Steven Jeffrey Zack, Burlington, NJ (US)

(73) Assignee: TVGateway, LLC, Philadelphia, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/458,320

(22) Filed: Dec. 10, 1999

(65) Prior Publication Data

US 2003/0188059 A1 Oct. 2, 2003

Related U.S. Application Data

(60) Provisional application No. 60/126,833, filed on Mar. 30, 1999.

(51) Int. Cl.$^7$ ............................................... G06F 13/38
(52) U.S. Cl. ........................... 710/74; 710/36; 711/111; 709/200
(58) Field of Search ............................ 710/74, 36, 38; 711/111, 114, 208; 709/200

(56) References Cited

U.S. PATENT DOCUMENTS 5,694,615 A * 12/1997 Thapar et al. .................. 710/2
6,219,753 B1 * 4/2001 Richardson .................. 711/114

* cited by examiner

Primary Examiner—Jeffrey Gaffin
Assistant Examiner—Harold Kim
(74) Attorney, Agent, or Firm—Moser, Patterson & Sheridan, LLP (57) ABSTRACT

A method and apparatus of utilizing a plurality of independent fiber channel arbitrated loops for moving, replicating and storing video information on storage devices in an interactive video information system. A plurality of servers are each comprised of a plurality of server modules. Each server module comprises a plurality of fiber channel (FC) disk drives coupled by a local port to a first fiber channel arbitrated loop within each server module. The plurality of FC disk drives on each of the plurality of server modules are also coupled to a second FC loop, via a backup port on each FC disk drive. By utilizing two independent FC loops in this configuration, data may be sequentially transmitted from a first server module, across the backup FC loop, to a second server module.

13 Claims, 5 Drawing Sheets

METHOD AND APPARATUS FOR TRANSFERRING DATA BETWEEN INDEPENDENT FIBER CHANNEL ARBITRATED LOOPS IN AN INTERACTIVE INFORMATION DISTRIBUTION SYSTEM

CROSS REFERENCE TO RELATED APPLICATIONS

This application claims benefit of U.S. Provisional Application No. 60/126,833, filed Mar. 30, 1999, which is hereby incorporated by reference in its entirety.

BACKGROUND OF THE INVENTION

1. Field of Invention

The present invention relates to the transfer of data in an interactive video-on-demand (VOD) distribution system. More particularly, the invention relates to a method of providing data between fiber-channel arbitrated loop arrays at each of a plurality of head-ends in an information distribution system.

2. Description of the Background Art

In an interactive information distribution system, such as an interactive video-on-demand (VOD) distribution system, a plurality of cable head-ends are utilized to serve as video content distribution points, for designated "neighborhoods" of subscribers. A request for video information, such as a movie, is made by selecting from a menu, a title displayed on a subscriber's monitor. After selection by the subscriber, the request is sent back, via an access network, to the local head-end supporting such subscriber. The requested video is then transmitted from the head-end to the subscriber for viewing.

A typical head-end comprises a VOD server system, having subsystems that interface with each other to manage, store and distribute the video content. The subsystems include a video stream server, video content storage devices, and host workstations for interfacing with various management software modules. Memory buffer boards, such as Compact PCI type boards, are also utilized by each subsystem for temporarily storing data, before streaming the data across an access network, and to the subscribers.

The server is typically, a parallel processing computer system, capable of accepting information requests from the management software modules, recalling that information from memory, and generating a plurality of video streams containing packetized video information. The video information may be stored within the computer system's disk drive array, off-line storage system such as an optical disk library, and/or is available from a digital or analog real-time program feed.

One function of an information video distribution system, is to transfer and replicate data between each of the head-ends. As subscriber viewership rises, there is a need to efficiently utilize bandwidth for transferring and storing such video data between the storage devices at each head-end.

To replicate video content from storage devices on one fiber channel arbitrated loop (FC-AL) to storage devices on other FC-AL's, requires the data to be transferred or replicated from a single source FC disk loop, to a first memory buffer board within one of the sub-systems of the server. The memory buffer board of the source subsystem, then transfers the data across a video switch to a receiving memory buffer board, in a subsystem of another server. Once the data has been stored on the receiving memory buffer board, the data is written to the appropriate disk drives on a second destination FC disk loop.

A disadvantage of transferring data from one memory buffer board to another memory buffer board in a different sub-system, is that such data transfer consumes a large portion of the available bandwidth on both memory buffer boards. Furthermore, the available bandwidth of a video switch, which links the servers at each head-end across an inter-server network, is also inefficiently utilized. Thus, the bandwidth on the memory buffer boards, which would normally be used for transmitting streams of information to the subscribers, is thereby reduced.

As subscriber viewership grows, the head-end servers and subsystems have a greater level of activity. The processing circuitry and memory are processing more information, which results in a higher latency at each the head-end, for responding to the individual subscriber requests. In such an environment where demand is great, and expectations by the subscriber are for an instantaneous and seamless service, there becomes a need to implement a means to efficiently transfer or replicate such video content, without the tradeoff of decreasing the bandwidth necessary to stream such information to the subscribers.

SUMMARY OF INVENTION

The disadvantages heretofore associated with the prior art are overcome by the present invention of a method and apparatus of utilizing two independent fiber channel arbitrated loops for moving, replicating and storing video information in an interactive video information system. A plurality of servers, are each comprised of a plurality of server modules. Each server module comprises a plurality of fiber channel (FC) disk drives, coupled by a "local" port to a first independent, "local" fiber channel arbitrated loop, to create a "virtual FC disk drive", within each server module. The plurality of FC disk drives on each of the plurality of server modules are also coupled to a second independent, "backup" fiber channel arbitrated loop, via a "backup" port on each FC disk drive. By utilizing two independent FC loops in this configuration, data may be sequentially transmitted from a first server module, across the backup FC loop, to a second server module.

In a preferred embodiment of the invention, each server comprises eight server modules, each server module having eight FC disk drives respectfully coupled to an independent local FC loop, via the local port of the disk drive. Each local FC loop also has an associated FC controller and processing circuitry, to allow the server module to transfer and receive information. The backup FC loop comprises a "backup" FC controller to control the flow of data between the disk drives on the backup FC loop. Thus, a head-end server comprises a group of server modules linked together by the independent backup FC loop, to form a "virtual server".

A method for transferring and replicating information between one server module to another server module, is accomplished by utilizing the backup FC loop as a physical medium between the disk drives in each of the server modules. The backup FC loop allows video information to be serially transferred from the storage devices on each local FC loop, without losing any of the bandwidth from having to utilize memory buffer cards to temporarily store video information or any of the video switch bandwidth. An advantage of utilizing two independent FC loops, is that the memory buffers on each of the subsystems are no longer required as a shared resource for storing data when streaming data to the subscribers, and when transferring data back and forth between server modules.

Furthermore, by connecting each server to a FC switch and an inter-server network, content may be moved from one server to another, in a similar manner as between two or more server modules. This has an additional benefit, in which a secondary storage device (e.g., DLT (digital linear tape drive)) is not needed as frequently for loading video information, since the video information would only have to be retrieved once from the secondary storage device, when replicating such video information. Thereafter, the video content may be copied from each server module on one server, to server modules having available storage capacity on other servers, which are coupled through an inter-server network and the FC switch.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

In a typical video-on-demand system, many video assets are frequently requested by a large segment of the subscribers. To accommodate greater subscriber demand, replicating and storing frequently requested video content at various head-ends for distribution to subscribers may be accomplished by the inventive method and apparatus described herein. Such method and apparatus, transfers video content from a plurality of storage devices sharing two independent fiber channel arbitrated loops (F-CAL) in a server of an interactive video distribution system. Additional copies of the video assets at each head-end enables a service provider to meet the subscriber demand for streamed video, by increasing the available content supply.

Video content is stored on a plurality of disk drives coupled to a server at a head-end. Video content that is requested from a subscriber is distributed from a first ("local") FC loop coupled to the disk drives storing such video content. In the background of system operations, or during system maintenance of the video information distribution system, intra-server and inter-server data transfers may be performed, via a second ("backup") FC loop, for transfer and replication of content at each head-end, to meet the subscriber demand for video content. As used herein, the terminology, data, information, and content are to be considered as equivalent.

Figure 1:
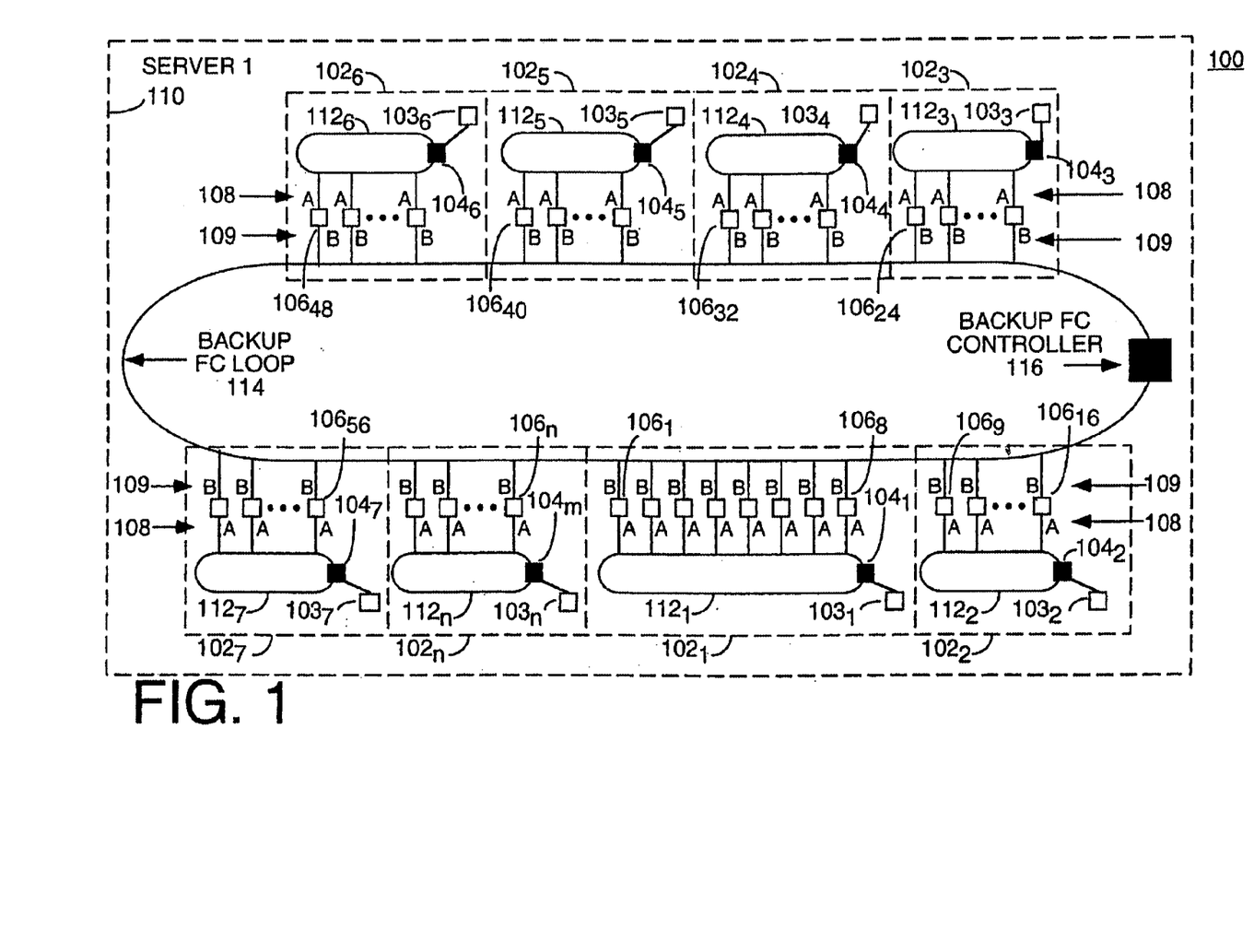
FIG. 1 depicts a high-level block diagram of a server in an interactive video distribution system.

Specifically, FIG. 1 depicts a high-level block diagram of a server 110 in an interactive video distribution system 100. The server 110 comprises a plurality of server modules $102_1$ through $102_n$ (collectively server modules 102). Each server module 102 comprises a plurality of fiber channel (FC) disk drives $106_1$ through $106_m$ (collectively disk drives 106), coupled to a respective local fiber channel arbitrated loop (FC-AL) $112_1$ through $112_n$ (collectively local FC loops 112). Furthermore, each disk drive 106 is coupled to a respective local FC loop 112, via a local port 108 "A", as depicted in FIG. 1.

Coupled to the local FC loop 112 of each server module 102, is a local fiber channel controller $104_1$ through $104_p$ (collectively local FC controllers 104), via a FC-AL connection. Each of the local fiber channel controllers 104 is also coupled to other processing and bus devices 103 of each respective server module 102, through a separate signal path interface.

Typically, bus circuitry, at least one processor, memory, input/output devices and other processing circuitry, for processing video information are utilized in each server module 102. As such, the fiber channel controller 104 interfaces between the disk drives 106 on the respective local FC loop 112, and the processing and bus devices 103 of the respective server module 102, to interpret and control processing commands.

Each server module 102 contains video content, such as movies, stored on the respective plurality of disk drives 106. When a subscriber requests video content, a server module 102 storing such video content on the respective disk drives 106, transmits the content through the respective local FC loop 112 to other subsystems, including various modulators and a hybrid fiber-coax transport system (not shown, but mentioned for completeness of disclosure) of the server module 102, for transmission to the requesting subscribers.

Multiple server modules 102 are coupled together, via a backup fiber channel arbitrated loop 114 (backup FC loop 114), to create a "virtual server" 110. In particular, each disk drive 106 of each of the server modules 102, is coupled to the backup FC loop via a backup port 109 "B" on the disk drives 106, as depicted in FIG. 1. Thus, each disk drive 106 has two ports 108 and 109, and is shared between two independent loops 112 and 114. The local FC loop 112 couples the local ports 108 of the disk drives 106 for each particular server module 102, and the backup FC loop 114, couples the plurality of server modules 102 together, via the backup port 109 of the disk drives 106.

A fiber channel arbitrated loop (FC-AL) is a serial data transport medium, in which data and control signals pass along a single path, rather than moving in parallel across multiple conductors, as in the case of the small computer systems interface (SCSI) bus and corresponding SCSI devices. According to the American National Standards Institute (ANSI) standards, fiber channel mediums permit up to 127 devices, including an active fabric device or "master", such as a controller, to be serially connected to form a FC loop. Furthermore, each local FC loop 112 is independent of any other independent local FC loop 112 in the system. Moreover, each independent FC loop may be apportioned varying numbers of disk drives 106 from another FC loop. For example, one local FC loop 112 may have 8 disk drives, while other local FC loops may have more or less disk drives 106, as required.

The backup FC loop 114 is also an independent loop, and likewise, may receive up to 126 disk drives 106, plus a master, such as a fiber channel controller 116. The backup fiber channel controller 116 is coupled to the backup FC loop 114, as a master controller for controlling data flow on the disk drives 106, between each of the server modules 102 connected to the backup FC loop 114.

As such, the total number of disk drives 106 on each server 110 is limited by the presence of the backup FC loop 114. For example, in FIG. 1, each of the eight server modules 102 has eight disk drives 106 coupled by each disk drive's local port 108, to the server module's 102 respective local FC loop 112. Thus, there are 64 disk drives present. Furthermore, all 64 disk drives 106 of the eight server modules 102 are coupled to the backup FC loop 114 of the server 110, by each disk drive's backup port 109.

By utilizing an eight disk drive per local FC loop configuration, a maximum of 15 local FC loops 112, are attainable, without exceeding the 126 device limitation set by the backup FC loop 114. Similarly, a configuration having twenty-one local FC loops 112, each containing six disk drives 106, could alternately be arranged, and so forth, depending on the VOD system requirements.

A preferred method of connecting the disk drives 106 in a loop is directly through a backplane. The fiber channel disk drives 106 on each loop 112 are mounted in disk enclosures utilizing a backplane having built-in fiber channel loops. Each loop is then controlled by a fiber channel controller 104, which is then coupled to a PCI bus of the corresponding server module 102. The FC-AL backplane provides a convenient means for hot plugging the disk drives, while minimizing the length of the connections between the drives. Those skilled in the art will recognized that other means to store and couple the fiber channel disk drives to a server module are also readily available.

Data communications are performed over a fiber channel link, such as a FC loop, by interconnecting the ports. A port comprises both a transmitter and a receiver, and may act as an originator and responder, respectfully, or function as both. Additionally, each port has a unique name called a port identifier. Each node only has to manage a point-to-point connection between itself and another port. Thus, each disk drive 106 residing on the server 110 is a node on a loop, commonly known as a NL-Port.

Illustratively, the backup port 109 of a disk drive 106 serves as the originator, when the backup port 109 transmits the video content across the corresponding backup FC loop 114. Depending on the requested data flow destination, the information Is transmitted to a respondent backup port 109 on another server module 102 of the same server 110, or to a respondent port on the fiber channel switch 120 (see FIG. 2), for subsequent transfer to another server (not shown).

The video content is packetized in units, commonly known as frames. A frame is the smallest indivisible packet of data that is sent on a FC link. Each frame contains, amongst other information, the information to be transmitted (payload) and a destination address in a header of the frame. Since each port has its own unique port identifier i.e., specific address, the originator port routes each frame to the respondent backup ports 109 on the disk drives 106, matching the frame addresses.

In an instance where there are concurrent requests for data from a disk drive 106 between the local and backup ports 108 and 109, an arbitration process occurs between the local FC controller 104 on the local FC loop 112, and the backup FC controller 116, on the backup FC loop 114. Such an arbitration process occurs because a disk drive 106 cannot be accessed by two sources at the same time. During normal data traffic flow, once a transfer of data has been negotiated between two ports, those two ports or devices have exclusive access to the loop. Illustratively, a backup port 109 on a first disk drive 106 on the backup FC loop 114 requests to communicate and exchange information with a backup port 109 of a second disk drive 106 on the backup FC loop 114. However, the second disk drive 106 is actively communicating information (such as a movie to a subscriber) through the local port 108 on the local FC loop 112, with some other third port coupled to the local FC loop 112. Therefore, during an arbitration process, the backup port 109 on the first disk drive 106 must wait until the data transfer between the local port 108 and that other third port on the local FC loop is completed.

Figure 3:
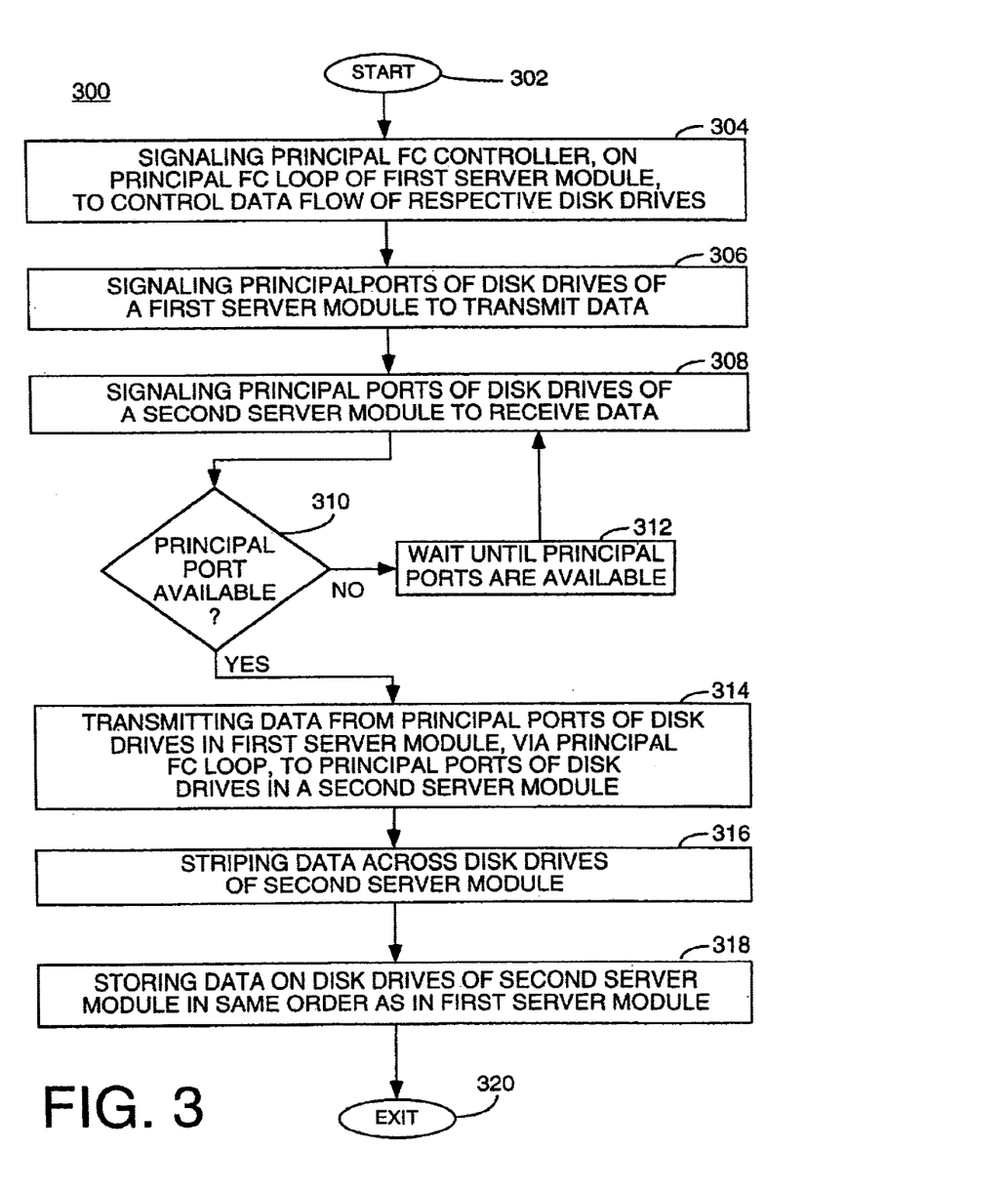
FIG. 3 depicts a flow diagram of the transfer of data between two server modules in a server.

FIG. 3 depicts a flow diagram of a routine 300 that is used to transfer data between two server modules. The method starts at step 302, and proceeds to step 304 wherein the processing circuitry of a first server module sends a signal to the backup FC controller. This signal initializes transfer of data across the backup FC loop to the respondent ports of a second server module. The processing circuitry maintains a file or table comprising the addresses of each block of data striped across each respective disk drive of each server module.

Storage of data may be implemented on a server, utilizing a fiber channel arbitrated loop, through a process known as loop striping. Loop striping is a method of connecting multiple disk drives on a loop into a "virtual disk drive", via an array through software, and dividing the virtual disk drive into contiguously addressed logical drives or extents. Each logical drive is then divided into identical strips of contiguously addressed blocks. Data is then stored in each block, across the disk drives on the loop.

In step 306, the backup FC controller on the backup FC loop sends instructions to the backup ports on each disk drive of the first server module, to transmit the stored data. The backup ports of each disk drive serve as the originator ports, when transmitting each frame of data to the respondent ports of the second server module. After receiving the transmission instructions and addresses of the respondent ports, at step 308, the backup FC controller sends a "ready" signal to the backup ports of the disk drives (respondent ports) of the second server module.

At step 310, in the instance where the respondent ports of the second server module are not available, an arbitration loop process is implemented wherein, at step 312, the originator ports of the disk drives from the first server module wait until the respondent ports of the second server module are available. After a reasonable time, if the respondent port on the disk drives of the second server module are not available, the backup FC controller will "time out", and notify a system administrator of the failure to transfer data.

In step 310, in an instance where the respondent ports of the second server module are available, the method proceeds to step 314. In step 314, the originator ports, (backup ports of the disk drives in the first server module) transmit the data, frame by frame, via the backup FC loop to the respective respondent ports of the disk drives in the second server module. In step 316, the FC controller and processing circuitry of the second server module stripe the data received by the respective respondent ports, across the disk drives. In step 318, the data stored on the disk drives of the second server module is stored in the same order, as the disk drives of the first server module. In this manner, the data has been either moved or replicated, as required by the VOD system, and at step 320, the method ends.

Figure 2:
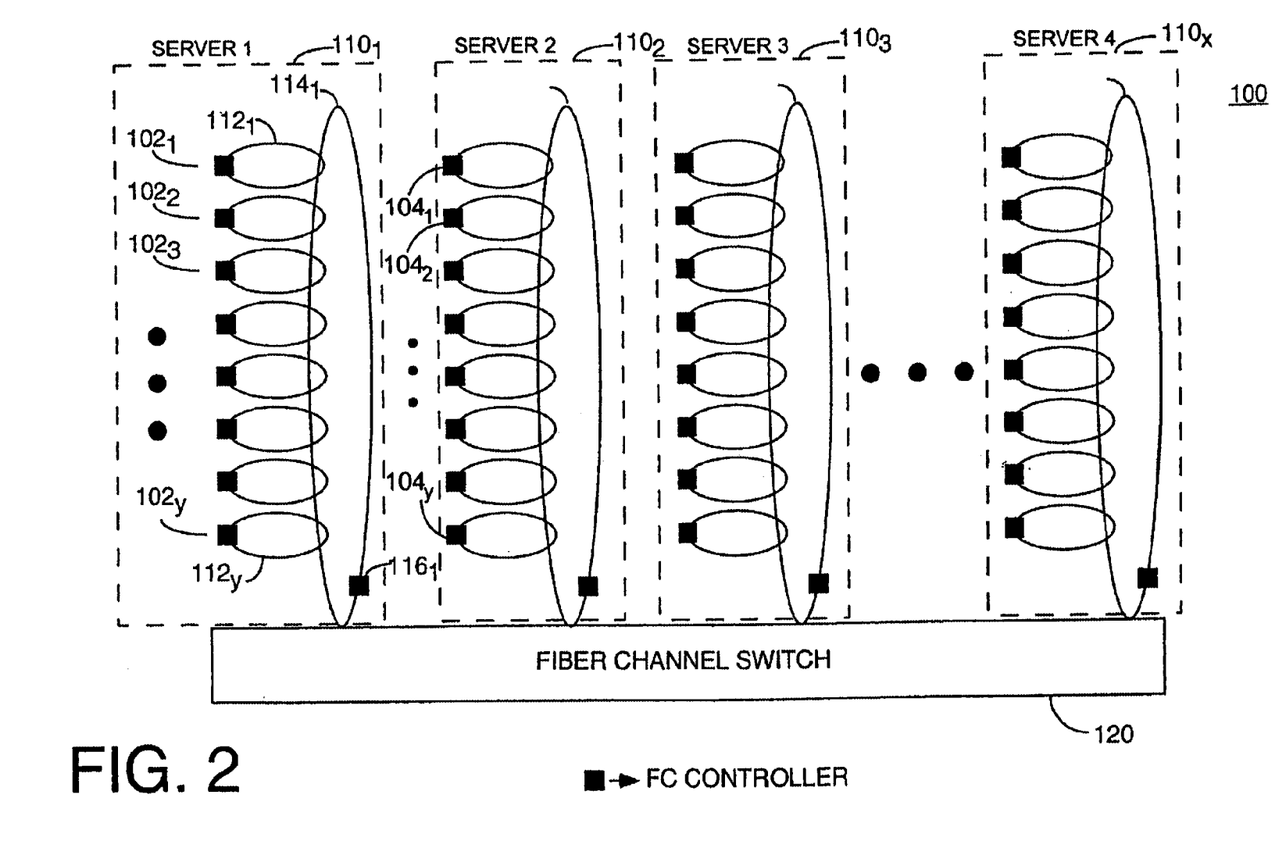
FIG. 2 depicts a high-level block diagram of a plurality of servers.

The method and apparatus may be further utilized in a second embodiment, for moving or replicating data between head-ends of an interactive video distribution system, i.e., from server to server. FIG. 2 depicts a high-level block diagram of a plurality of servers in an interactive video distribution system 100. Specifically, the plurality of servers $110_1$ through $110_x$ (collectively servers 110) in a video-on demand system (VOD system), are coupled together by a fiber channel switch 120, to allow transfer of information between each server 110 across an inter-server network.

Each server 110 comprises a plurality of server modules 102, as illustratively depicted in FIG. 1.

Referring to FIG. 2, each server module 102 respectively comprises a local FC controller 104 and a plurality of disk drives (not shown) coupled to a local FC loop 112. Furthermore, each server module 102 of each server 110 is coupled to the FC switch 120 through each of the server module's respective disk drives (not shown), via a backup FC loop $114_1$ through $114_x$ (collectively backup FC loop 114).

Coupled to the backup FC loop 114 of each server 110 are processing components (not shown), for processing information between the server modules 102, and a backup FC controller $116_1$ through $116_x$ (collectively backup FC controller 116). Moreover, the respective plurality of disk drives (not shown in FIG. 2) of each server 110 are coupled to the backup FC loop 114 by a backup port "B", as depicted in FIG. 1. Thus, in the preferred embodiment, sixty-four disk drives are coupled to the corresponding backup FC loop 114 of a respective server 110.

A person skilled in the art will appreciate that more than one local FC controller 104 and 104' may be coupled to a local FC loop 112, as well as more than one backup FC controller 116 and 116' may be coupled to the backup FC loop 114, respectively, for purposes of redundancy. Furthermore, each server 110 may have variable configurations, wherein the number of server modules 102 differ between servers 110. Moreover, the individual server modules 102 may comprise varying quantities of disk drives 106.

Each server 110 is coupled to a fiber channel switch 120, via the server's respective backup FC loop 114. Together, the backup FC loop 114 and the FC switch 120 couple each server module 102 together, thereby forming a network of servers 110 in the interactive video distribution system 100. As such, the server 110 may transfer or channel data between servers at other head-ends.

The local and backup fiber channel loops 112 and 114, and the FC switch 120 provide a high speed data transport medium (100 MB/sec.), when moving or replicating video information from either one server module to another server module (as depicted in FIG. 1), or from one server to another server (as depicted in FIG. 2). The fiber channel arbitrated loops also provide an efficient way to utilize the bandwidth across the FC switch 120 and the corresponding inter-server network, because the FC loops replace the slower memory buffer boards, typically utilized by the servers 110 for data transfer to the subscribers.

In the interactive video distribution system 100, a function of the fiber channel switch 120 is to allow each server to move or copy video content between the servers of other head-ends. Specifically, FIGS. 4A and 4B collectively depict a flow diagram of a routine 400 for transferring data between a plurality of servers. The method starts at step 402, and proceeds to step 404 where the processing circuitry of a first server signals a backup FC controller on the backup FC loop of the first server, to control data flow from the respective disk drives in each server module to a final destination, such as the server modules of a second server.

Figure 4A:
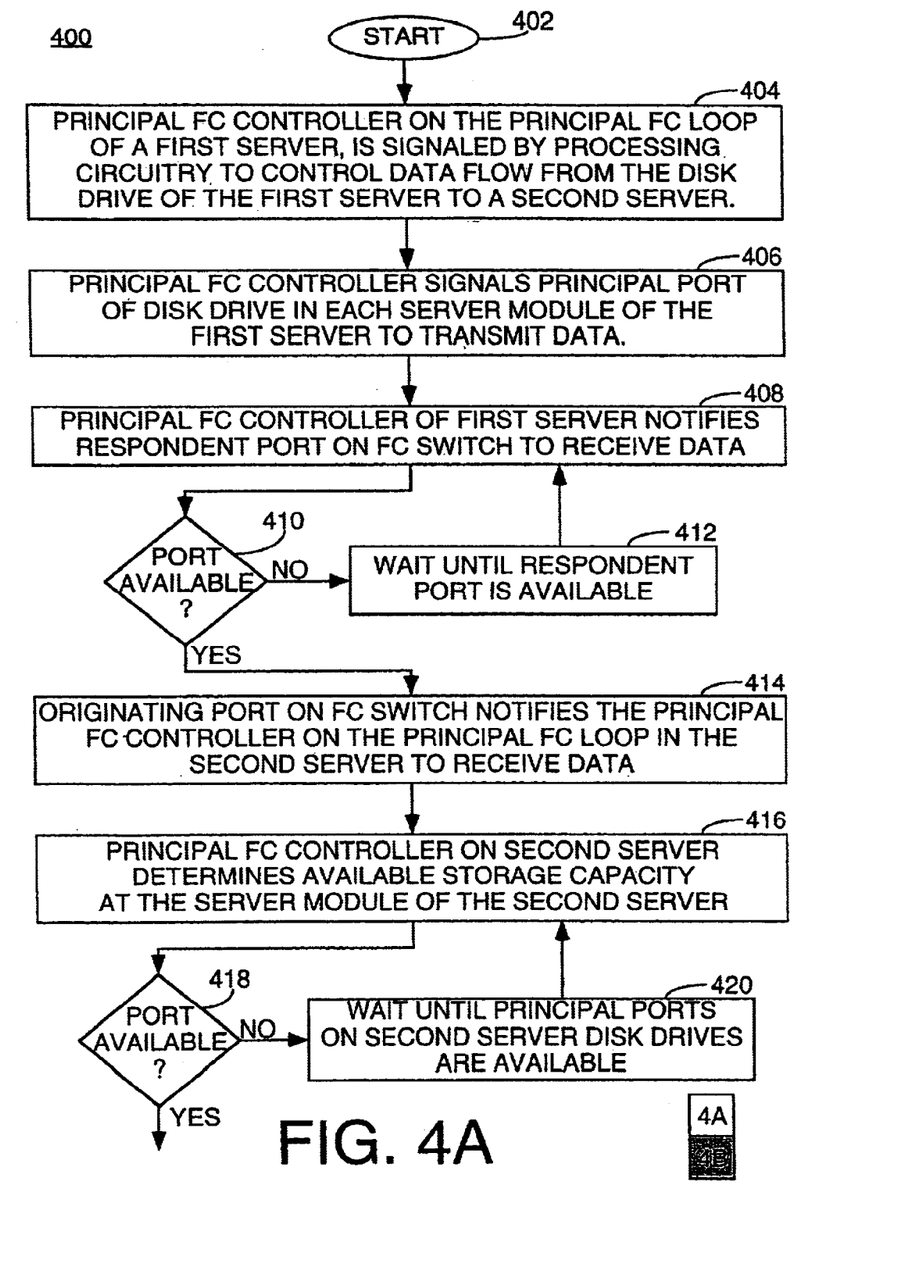
FIGS. 4A and 4B collectively depict a flow diagram of the transfer of data between a plurality of servers.
Figure 4B:
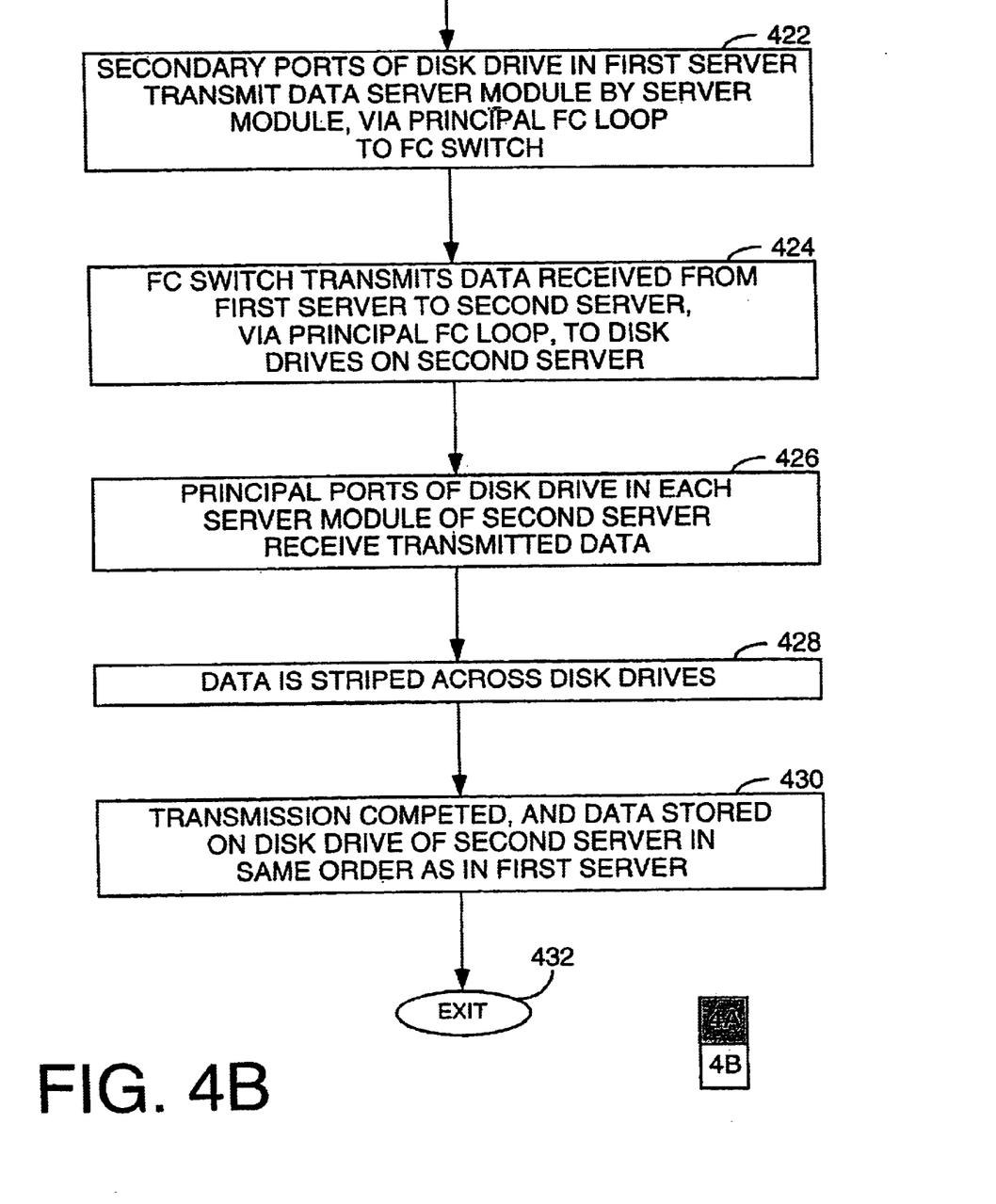

In step 406, the backup FC controller of the first server signals the respective backup ports of the disk drives in each of the server modules having data to be moved or replicated, to transmit such data. At step 408, the backup FC controller also notifies a respondent port on a FC switch to receive such data. The port may only receive data in an inactive state. In step 410, the backup FC controller of the first server determines if the respondent port of the FC switch is available to receive data. In the instance where the FC switch port is not ready, at step 412, the backup FC controller defers the originating backup ports of the respective disk drives of the first server from transmitting data, until the FC switch port is available. After a reasonable time, if the respondent port on the FC switch is not available, the backup FC controller of the first server will "time out" and notify a system administrator of the failure to transfer data.

If, at step 410, the respondent port of the FC switch is available to receive data, the method proceeds to step 414. In step 414, an originating port of the FC switch signals the backup FC controller on the backup FC loop in the second server to receive data. Then, at step 416, the backup FC controller on the backup FC loop in the second server communicates with the second server's processing circuitry to locate available storage capacity at the respective server modules of the second server. Once the server modules on the second server have been selected by the second server's processing circuits, in step 418, the originating port on the FC switch determines whether the respondent ports on the second server's disk drives are available. In an instance when the disk drives on the second server's server modules are not available, then at step 420, the originating port of the FC switch defers from transmitting any data. After a reasonable time, the FC switch will time out and a message will be sent to the system administrator that a data transfer has failed.

If at step 418, in the instance when the originating port of the FC switch is available, then at step 422, the backup ports of the disk drives in the first server transmit the data, server module by server module, via the backup FC loop, to the respondent port of the FC switch. To perform this transfer, the FC switch receives the frames from the source node, (i.e., the backup ports of the disk drives on the first server), and then routes them to the destination node (i.e., the respondent port of the FC switch). In doing so, the FC switch relieves each individual port of the responsibility for station management. Each node only has to manage a simple point-to-point connection between itself and the FC switch. Thus, a port on the FC switch is the respondent port with respect to, illustratively the first server.

Similarly, a port on the FC switch is the originator port, with respect to the destination (respondent) ports on the second server. In an instance where the disk drives on the second server's server modules are available, then at step 424, the originator port of the FC switch transmits the data received from each server module of the first server. The data is transmitted to the second server, via the backup FC loop, to the backup ports of the disk drives of the server modules in the second server. In step 426, the backup ports of the disks for each server module in the second server receive the data from the FC switch.

In step 428, the data is striped across the disk drives of each server module of the second server, and at step 430, the data transmission is completed with the data stored in the same order as received from the FC switch. Thus, the data on the second server is distributed in the same logical order as the data on the first server, and at step 432, the method ends.

This method may be illustratively visualized, by FIG. 2. If the source server is server 1 $110_1$ and the destination is server 3 $110_3$, the processing components of server 1 $110_1$ send a command to the FC controller $116_1$ coupled to the backup FC loop $114_1$ of server 1 $110_1$. The backup FC controller $116_1$ controls the flow of data from the respective backup port 109 of each of the disk drives 106 where the data is stored, to the fiber channel switch 120. A respondent port on the FC switch 120 receives the video content stored on server 1 $110_1$ from the respective disk drives 106, through the backup FC loop $114_1$. Then the fiber channel switch 120 transfers the requested video information stored on server 1 $110_1$, through an originator port, to the disk drives 106 in the server modules 102 having available space on server 3 $110_3$. In this manner, the FC switch 120 serves simultaneously as both a port for receiving and transmitting data. Video content may be transferred or replicated from any one server module, or all of the server modules, of a server, to another server.

For real-time video information distribution systems, there is no requirement for the data to be "mirrored" exactly on the destination loop of another server module 102 or server 110. When content is moved or copied from one loop to another loop, the processing devices, in conjunction with the backup FC controller of the destination backup FC loop, manage how the data is stored on the disk drives coupled to the backup FC loop. For instance, video content stored on the first server module $102_1$ of server 1 $110_1$ may be stored on any server module 102 of server 3 $110_3$ that has available disk drive storage capacity, and maintain the order of the streamed information. Thus, the only requirement is that the sequential order that the data that is moved or replicated, remain constant. In an interactive video distribution system utilizing two independent loops in the manner described herein, the order of data, when transferred, will not be disturbed because the transmissions are performed serially.

It should be apparent to those skilled in the art that a novel system for storing and distributing video content on a plurality of servers within an interactive information distribution system has been provided. The methods and apparatus described herein eliminate the need for the video information to memory buffer boards prior to transmitting and receiving the information at a storage device. Instead, video information may be moved or replicated from one server to another server, without significant reductions in bandwidth, or the latency effects in moving, replicating and storing the video information as displayed by the prior art. Although various embodiments that incorporate the teachings of the present invention have been shown and described in detail herein, those skilled in the art can readily devise many other varied embodiments that still incorporate these teachings.

What is claimed is:

1. Apparatus for providing data, comprising:
  a plurality of server modules, wherein each of said server modules comprises a first fiber channel (FC) arbitrated loop and a plurality of storage devices having a first port and a second port, said plurality of storage devices connected to said first FC arbitrated loop via said first port; and
  a second fiber channel arbitrated loop, said second FC arbitrated loop connected to said plurality of server modules via said second ports of each of said plurality of storage devices.

2. The apparatus of claim 1, wherein each of said plurality of server modules further comprises:
  a first FC controller, coupled to said first FC loop of each of said plurality of server modules; and
  a second FC controller, coupled to said second FC loop.

3. The apparatus of claim 2, wherein:
  data is transferred from a first server module of said plurality of server modules, through said second FC loop, to a second server module of said plurality of server modules.

4. The apparatus of claim 1, wherein:
  data is transferred from said first server module, across said second FC loop, and to a second server module.

5. Apparatus for providing data, comprising:
  a plurality of servers each having a plurality of server modules, where each said server module comprises a first fiber channel (FC) arbitrated loop and a plurality of storage devices having a first port and a second port, said plurality of storage devices connected to said first FC arbitrated loop via said first port;
  a second fiber channel arbitrated loop, connected to each of said second ports of each of said plurality of storage devices for each of said plurality of server modules of each server; and
  a FC switch, coupled to said second FC arbitrated loop of each of said plurality of servers.

6. The apparatus of claim 5, wherein each of said plurality of server modules further comprises:
  a first FC controller, coupled to said first FC loop of each of said plurality of server modules; and
  a second FC controller, coupled to said second FC loop.

7. The apparatus of claim 6, wherein:
  data is transferred from a first server of said plurality of server, through said FC switch, to said second server of said plurality of servers.

8. The apparatus of claim 7, wherein:
  said data is streamed from said second server to at least one data requestor in response to a respective request for said data.

9. A method for providing data between a plurality of storage devices coupled to a plurality of primary loops, comprising:
  requesting a transfer of data from a first storage device on a first primary FC arbitrated loop to a second storage device connected to a second primary FC loop;
  sending said data from said first storage device to a secondary FC arbitrated loop connected to said first storage device on said first primary FC arbitrated loop;
  sending said data from said secondary FC arbitrated loop, which is also connected to said second storage device on said second primary FC arbitrated loop, to said second storage device on said second primary FC arbitrated loop; and
  storing said data on said second storage device in a sequential order.

10. A method for providing data between a plurality of server modules, comprising:
  requesting, a transfer of data from at least one storage device of a first server module of said plurality of server modules, to a second server module of said plurality of server modules;
  sending said data from said at least one storage device of said first server module to a FC arbitrated loop connected to said at least one storage device of said first server module;
  sending said data from said FC arbitrated loop, which is also connected to said second storage device of said second server module, to said second storage device of said second server module; and
  storing said data on said second server module in a sequential order.

11. The method of claim 10, further comprising:

sending said data through a first port of said at least one storage device of said first server module when said first port of said at least one storage device of said first server module is available to transmit said data; and receiving said data through a second port of said at least one storage device of said second server module when said second port of said at least one storage device of said second server module is available to receive said data.

12. A method for providing data between a plurality of servers in an interactive video distribution system, comprising:

requesting a transfer of data from at least one storage device of a server module of a first server of said plurality of servers to at least one storage device of a server module of a second server of said plurality of servers;

sending said data from said at least one storage device of said server module of said first server of said plurality of servers to a first FC arbitrated loop of said first server connected to a FC switch;

sending said data from said FC switch to a second FC arbitrated loop of said second server of said plurality of servers; and storing said data on at least one storage device of said server module of said second server in a sequential order.

13. The method of claim 12, further comprising:

sending said data through a first port of said at least one storage device of said first server module of said first server, when said first port of said at least one storage device of said first server module of said first server is available to transmit said data; and receiving, said data through a second port of said at least one storage device of said second server module of said second server, when said second port of said at least one storage device of said second server module of said second server is available to receive said data.

* * * * *